Jan. 1, 1963   H. A. ENGE   3,071,702
HIGH-VOLTAGE GENERATOR WITH SOLID INSULATION
Filed Dec. 3, 1958

United States Patent Office 3,071,702
Patented Jan. 1, 1963

3,071,702
HIGH-VOLTAGE GENERATOR WITH SOLID INSULATION
Harald A. Enge, Winchester, Mass., assignor to High Voltage Engineering Corporation, Burlington, Mass., a corporation of Massachusetts
Filed Dec. 3, 1958, Ser. No. 777,935
4 Claims. (Cl. 310—6)

This invention relates to high-voltage generators, and in particular to the use of solid insulation with equipotential shields for an electrostatic belt-type generator, a Cockcroft-Walton generator or for a rectify-as-you-go transformer. An advantage of the invention is that it permits the construction of high-voltage generators of reduced size with little or no compressed gas. Standard sizes of most parts may be used and are independent of voltage. The invention is especially adaptable for a tandem-type particle accelerator, wherein charged particles are accelerated up to a high-voltage terminal and then, after the polarity of their charge has been reversed by an appropriate device, accelerated away from the same high-voltage terminal.

The use of solid insulation in accordance with the invention in electrostatic belt-type generators permits such an electrostatic generator to be standardized for from 1 to 10 million volts. In a generator constructed in accordance with the invention only the length of the apparatus increases substantially with increasing voltage. This is in contrast to the present gas-insulated electrostatic belt-type generator in which both diameter and length increases more than proportionally with increasing voltage.

Where solid insulation is used with an electrostatic belt-type generator in accordance with the invention, a short between adjacent conductive layers will have but little effect, and there is no heating or field distortion which can do harm. It is possible that focusing or defocusing effects in the acceleration tube might occur, but such effects would be minimized except at that end of the tube where the particles have not yet acquired substantial velocity. Where solid insulation is used in connection with a transformer in accordance with the invention, a short between adjacent conductive layers might cause the transformer to burn out; however, the safety factor required can be the same as that of an ordinary transformer. A representative safety factor is 10.

The invention may best be understood from the following detailed description thereof having reference to the accompanying drawing in which.

Figure 2:
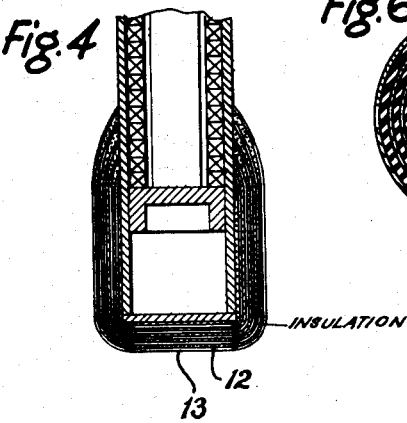
FIG. 2 is an enlarged view in longitudinal central section showing in detail the high-voltage portions of the apparatus shown in FIG. 1.
Figure 1:
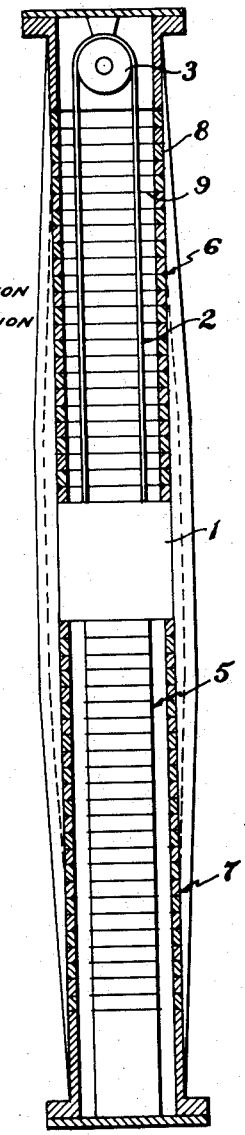
FIG. 1 is a somewhat diagrammatic view, mainly in longitudinal central section, of the principal parts of an electrostatic belt-type generator constructed in accordance with the invention, together with its associated acceleration tube.

Referring to the drawing and first to FIGS. 1 and 2 thereof, the electrostatic belt-type generator therein shown includes a high voltage terminal 1 and an insulating belt 2 supported between two pulleys 3, 4, one 3 at ground potential and the other 4 within the hollow electrode 1 which constitutes the high voltage terminal. The operation of an electrostatic belt-type generator is well-known and is described, for example, in United States Patent No. 1,991,236 to Van de Graaff and No. 2,252,668 to Trump and at vol. XI, page 1, of "Reports on Progress in Physics" (1948). It is sufficient herein to state that electric charge is transported from the grounded end of the device to the high-voltage terminal 1 on the insulating belt 2. As in the conventional electrostatic accelerator the high voltage thus generated is used to accelerate charged particles to high energy within an acceleration tube 5. In the device shown in FIGS. 1 and 2, the acceleration tube 5 extends from the high-voltage terminal 1 in the direction opposite to that in which the voltage-generating portion of the device extends. The charging belt 2 and the acceleration tube 5 are each enclosed within a tubular column 6, 7 which comprises a multiplicity of alternating glass or Lucite rings 8 and metal apertured disks 9. In accordance with the invention, the high-voltage terminal 1, whose external surface lies flush with that of the insulating columns 6, 7, is surrounded by a series of alternating layers of conductors 10 and insulators 11. For example, the layers may comprise aluminum foil 10 separated by Mylar 11. The interior-most layer is only slightly longer than the length of the high voltage terminal 1 measured parallel to the longitudinal axis of the device, and each successive layer is slightly longer than its predecessor. At intervals the metal portions 10 are electrically connected to the electrode disks 9. Because of the solid insulation 11 with equipotential shields 10, it is no longer necessary that the electrode disks 9 extend out between intervening insulating rings 8, nor is it necessary that external equipotential rings be connected to these electrode disks 9. Each layer may be affixed to the preceding layer by wrapping it about the same and then painting the seams over it with an epoxy resin such as Araldite to fill voids.

Figures 4, 6:
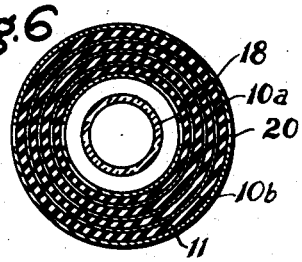
FIG. 4 is a view showing an alternative construction of the apparatus shown in FIG. 3.
FIG. 6 is a section along the line 6—6 of FIG. 5.

If desired, as shown in FIG. 4, the acceleration tube 5 and voltage generator may both be on the same side of the terminal 1, and the solid insulation 11 and equipotential shields 10 may be terminated with alternate disks of Lucite 12 and aluminum foil 13, respectively.

Figure 3:
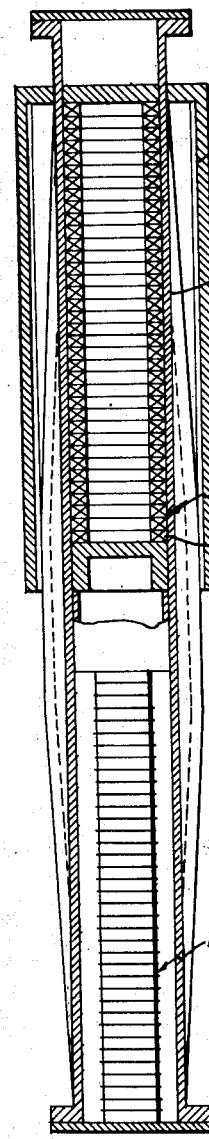
FIG. 3 is a view similar to that of FIG. 1 but showing the use of solid insulation in a high-voltage transformer in accordance with the invention.

Referring now to FIGS. 3 and 4, the solid insulation with equipotential shields therein provided is identical to that shown in FIGS. 1 and 2. The voltage-generating end of the device shown in FIG. 3 is surrounded by a ferrite container 14 at ground potential, close to the inner surface of which is wound the primary coil 15. The secondary coil 16 is made up of a series of separate units 17 in accordance with my co-pending application, Serial No. 750,794, now Patent No. 2,971,145. The secondary coil 16 is surrounded by an insulating pipe 18 which extends the length of the device. The acceleration tube 19 is provided at the opposite end of the device, as in the device shown in FIG. 1. The acceleration tube 19 itself is evacuated, but the region between it and the insulating pipe 18 may be filled with pressurized air. The insulating pipe 18 may, if desired, consist of alternating rings of glass or Lucite and aluminum conductors, as shown in FIG. 1. In the transformer application, the equipotential layers of aluminum must not form short circuiting rings but will have to be split.

With Mylar insulation, a thickness of .020" is required to insulate 20 kilovolts with a safety factor of almost 10. At 5 million volts this means a total Mylar thickness of 5". The insulating pipe 18 of FIG. 3 may have an inner diameter of 30 centimeters and a 2 centimeter wall thickness. The radius of the secondary coil 16 may be 14 centimeters and that of the primary 15 may be 30 centimeters. In this event, the ratio of secondary flux to primary flux is .218, and the primary magnetizing voltage-amperes need to be about 40 times the D.C. power when good regulation is required. By "good regulation" is here meant that the full load voltage shall be no less than 80% of no load voltage. If the beam current is 1 milliampere, the D.C. power is 5 kilowatts at 5 million volts, so that the magnetizing voltage-amperes is about 200 kva. The flux density is given by the formula $$B^2 f = \frac{4 \times 10^7 VA}{\text{volume}}$$

where B is the flux density in gausses, $f$ the frequency in cycles per second, VA the voltage-amperes, and the volume is given in cubic centimeters. With a transformer length of 300 centimeters and other figures as given the flux density is found to be 30 gausses at a frequency of 10 kilocycles. The requisite secondary turns are then $2.69 \times 10^5$ or 1076 per unit 17, using 250 units at 20 kilovolts each. The primary voltage is 37.7 volts per turn and if there are 26 turns, the voltage is 980 volts, and the primary current is 195 amperes. A parallel capacitance in the primary circuit of 3.17 microfarads will resonate with the transformer so that only the 5 kilowatts plus losses will have to be delivered from a generator. Alternatively, if the frequency is 500 cycles per second, the flux density required is 134 gausses. 4800 turns per unit 17 of the secondary 16 will be required, and the primary 15 will need 118 turns, a voltage of 995 volts, and a current of 193 amperes, thus requiring a capacitance of 62 microfarads.

Figure 7:
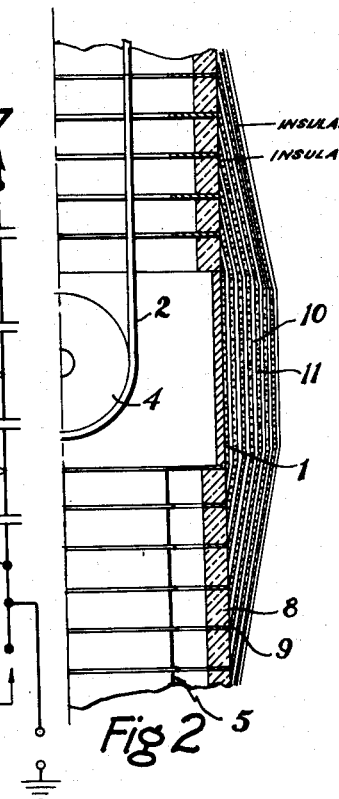
FIG. 7 is a circuit diagram showing the circuit of the apparatus of FIGS. 5 and 6.
Figure 5:
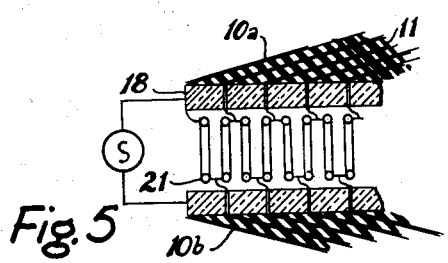
FIG. 5 is a view similar to that of FIG. 1 but showing the use of solid insulation in a Cockcroft-Walton generator in accordance with the invention.

Referring now to FIGS. 5 and 6, the solid insulation with equipotential shields therein provided is similar to that shown in FIGS. 1 and 2 but with the important exception that each of the equipotential shields is divided into two semi-cylindrical parts 10a, 10b by means of two gaps 20 comprising material which is a poor insulator. A series of rectifier units 21 are arranged on the inside of the insulating pipe 18. Each of these rectifier units 21 comprises a ring which contains a series of rectifiers of the solid-state type. Every other rectifier unit 21 is connected across the gap 20 of an equipotential shield 10, and the intervening rectifier units 21 are connected from one side 10a of one equipotential shield to the opposite side 10b of the adjacent equipotential shield. Each pair of adjacent halves 10a or 10b of adjacent equipotential shields 10 forms a condenser 22 and it will readily be seen from an inspection of FIGS. 5 and 6 that the rectifier units 21 and these condensers 22 are connected in the well-known Cockcroft-Walton circuit. The circuit diagram of such a circuit is shown in FIG. 7.

In the device shown in FIGS. 5 and 6 the insulation thickness may be 0.75 millimeter (or 30 mils) per layer. Thus for 56 kilovolts, the safety factor is approximately 5. To give a specific example, the outside diameter of the entire device shown in FIGS. 5 and 6 might be 65 centimeters; the total thickness of the laminated insulating portion being 15 centimeters while the outer diameter of the inner insulating tube 18 is 35 centimeters. Aluminum would be used as the equipotential shields 10 and Mylar as the insulator 11. Assuming a voltage output of 10 million volts, the device would be 20 meters long. Utilizing the device to accelerate charged particles with beam current of 100 microamperes one could assume a total load of 200 microamperes and hence a power output of 2 kilowatts. With 200 layers, the D.C. voltage per stage is 50 kilovolts; the no-load D.C. voltage per stage is 56 kilovolts and the A.C. voltage applied by the power supply 23 would be approximately 20 kilovolts. The maximum A.C. current goes through the first capacitor $C_1$ and for the first harmonic is 2 kilowatts divided by 20 kilovolts or 0.1 ampere. Referring to FIG. 7 and using the above figures, $C_1$ is equal to 0.77 microfarad. At 10 kilocycles the A.C. voltage drop across $C_1$ for the first harmonic is equal to 2.07 volts. For successive capacitors, proceeding up the column, the A.C. current decreases and the capacitors also decrease. The total A.C. voltage drop for the first harmonic is approximately 2.5 volts $\times$ 400 which is equal to 1000 volts. This is equal to 5% of the A.C. input from the power supply 23. For the higher harmonics there is less drop.

Each gap 20 must be insulated for 20 kilovolts A.C. In order to get an even gradient distribution one might "paint" a semiconductor upon a layer of Mylar 11 at the gap 20 between the two parts 10a, 10b of the adjacent equipotential shield 10.

Having thus described the principles of the invention together with several illustrative embodiments thereof, it is to be understood that although specific terms are employed, they are used in a generic and descriptive sense and not for purposes of limitation, the scope of the invention being set forth in the following claims.

I claim:

1. A high voltage generator comprising an elongated insulating column enclosing voltage-generating means and including a high voltage terminal and means for controlling the voltage distribution along said insulating column, and a series of alternating thin layers of solid insulating material and conductive solid material surrounding said elongated insulating column, said conductive solid material being electrically connected to controlled-voltage points on said insulating column, the longitudinal dimensions of the innermost layers corresponding to the dimensions of said high voltage terminal and the longitudinal dimensions of subsequent layers increasing seriatim to the outermost layer whose longitudinal dimensions correspond to the dimensions of said insulating column.

2. Apparatus in accordance with claim 1 wherein said insulating column is sub-divided by equipotential planes and wherein consecutive conductive layers are electrically connected to corresponding equipotential planes in the column.

3. Apparatus in accordance with claim 1 wherein said high voltage terminal is centrally located in said insulating column.

4. Apparatus in accordance with claim 1 wherein said high voltage terminal is at one extremity of said insulating column.

References Cited in the file of this patent

UNITED STATES PATENTS

| | | |
|---|---|---|
| 2,230,473 | Van de Graaff | Feb. 4, 1941 |
| 2,501,881 | Trump | Mar. 28, 1950 |
| 2,731,589 | Marsh | Jan. 17, 1956 |
| 2,875,394 | Cleland | Feb. 24, 1959 |
| 2,939,976 | Manni | June 7, 1960 |